(No Model.)
T. F. BOLAND & H. C. HUBBELL.
PRIMARY BATTERY FOR BICYCLE LAMPS.
No. 586,416. Patented July 13, 1897.
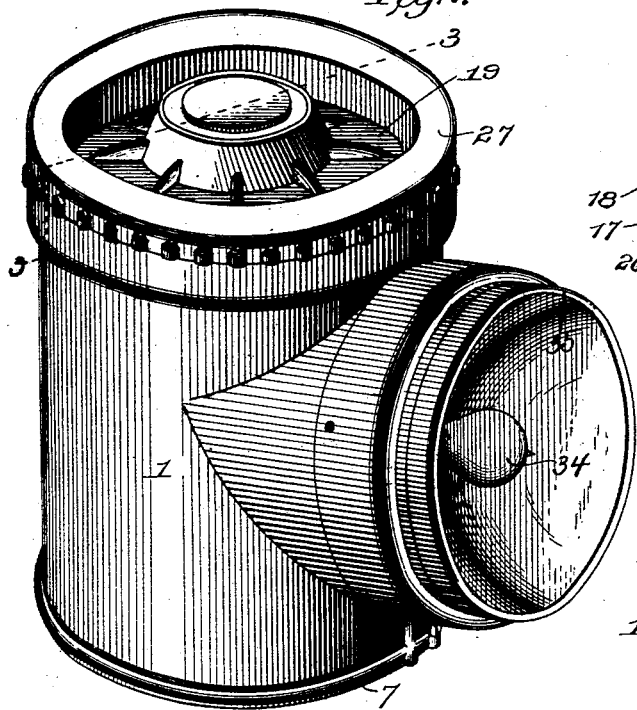
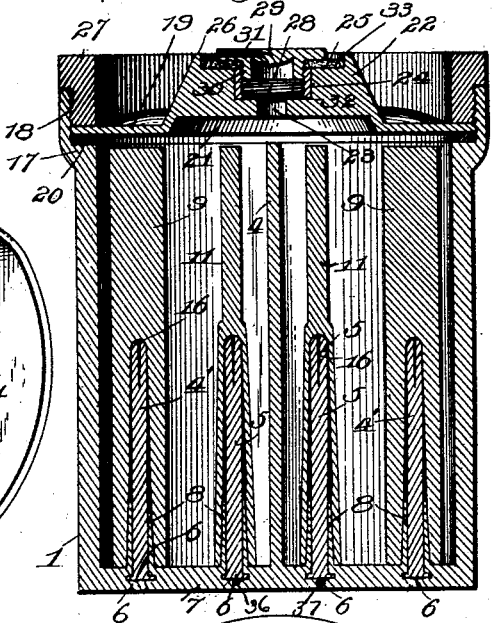
WITNESSES:
Harry S. Arthur
Albert Popkins.
INVENTORS
Thomas F. Boland & Harry C. Hubbell
BY Jas. L. Skidmore
their ATTORNEY.
THE NORRIS PETERS CO., PHOTO-LITHO., WASHINGTON, D. C.

UNITED STATES PATENT OFFICE.

THOMAS F. BOLAND AND HARRY C. HUBBELL, OF ELMIRA, NEW YORK, ASSIGNORS TO H. H. FULTON, OF SAME PLACE.

PRIMARY BATTERY FOR BICYCLE-LAMPS.

SPECIFICATION forming part of Letters Patent No. 586,416, dated July 13, 1897.

Application filed December 24, 1896. Serial No. 616,891. (No model.)

*To all whom it may concern:*

Be it known that we, THOMAS F. BOLAND and HARRY C. HUBBELL, citizens of the United States, residing at Elmira, in the county of Chemung and State of New York, have invented certain new and useful Improvements in Primary Batteries for Bicycle-Lamps; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to primary batteries; and its object is to provide an efficient and compact battery adapted especially for use in connection with lamps for bicycles or other like vehicles.

The invention consists in novel means for supporting the zinc elements of the battery in position within the battery-casing and for providing for the escape of noxious gases generated within the battery, and also in the features of construction described hereinafter and defined in the appended claims.

In the accompanying drawings, Figure 1 is a view in perspective of a battery embodying our invention combined with a bicycle-lamp and reflector. Fig. 2 is a plan view of the same with the cover removed. Fig. 3 is a transverse vertical section on the line 3 3 of Fig. 1. Figs. 4 and 5 are respectively a perspective view of the zinc element and a similar view of the charged plate constituting the other element of the battery, and Fig. 6 is a diagrammatic sectional view illustrating the wire conductors between the lamp and battery.

The jar or casing 1 of the battery is preferably cylindrical in shape and formed from a suitable plastic material. The casing is divided into two compartments 2 and 3 by a central vertical partition 4, embedded in the casing or made integral therewith.

Within each of the compartments or cells 2 and 3 are arranged two vertical rods 4' and 5, of conducting material. The manner of supporting and the construction of these rods constitute distinguishing characteristic features of the invention. Each of the rods is preferably enlarged at its lower end to form a head 6, and these heads, as well as the adjacent portions of the body of the rods, are embedded in the bottom 7 of the casing and thus firmly held in upright position.

The bottom 7 is formed with vertical tubular extensions 8, which extend upwardly to cover a part of the rods and constitute coverings or coatings for said rods to protect them from the action of the battery fluid. These protecting-coverings 8 are tapered or graduated in thickness for a purpose which will be hereinafter explained.

The outer rods 4' serve to support the zinc elements of the battery, said elements 9 each being preferably of cylindrical form and provided with a socket or tubular recess 10 to receive the upper end of the rod.

The inner rods 5 constitute supports for the battery-plates 11, each of which is provided with opposite vertical enlargements 12 and a central vertical socket 13 to receive the rod. Each of said plates 11 is also provided at its opposite side edges with lugs 14 and at its upper edge with a vertically-projecting central lug 15. The lugs 14 serve as stops or guards to contact with the walls of the casing in case the plates turn upon their supports, and the lug 15 facilitates the centering of the plate and its withdrawal for insertion.

The upper end of each of the rods 4' and 5 is formed with a central vertical slot 16, which bifurcates the rod at its upper end, and as we have found by experiment contributes appreciably to the effectiveness of its contact with the zinc and plate.

As illustrated in Fig. 3, the respective zinc cylinders 9 and plates 11 fit down over the bifurcated upper ends of the rods 4' and 5 to overlap the tapered coverings 8, and thus protect the rods from injurious contact with the battery fluid. The upper extremities of the rods are further protected from the action of the battery fluid by the presence of air at these points, occupying the space between the rods and the sockets in the plates and zinc cylinders.

The upper end of the casing 1 is provided with an internal annular shoulder 17 and is internally screw-threaded, as indicated at 18.

19 indicates the cover of the casing, provided on its under side with an elastic gasket 20 and adapted to fit upon the annular shoulder 17 of the casing. The under side of the cover 19 is provided with a central recess 21, and from its upper face projects a circular boss or enlargement 22, having an opening 23 communicating with the recess 21. The boss 22 is formed with an internally-threaded socket 24, surrounded by an annular shoulder 25, having a vertically-projecting flange 26.

The cover 19 is held removably upon the shoulder 17 of the casing by an externally-threaded ring 27, adapted to engage the threaded upper end of said casing. Within the socket 24 of the cover is located a thin rubber disk 28, punctured to permit of the escape of gases through it, and the opening in said cover is closed by a cap 29, provided with an externally-threaded depending flange 30, adapted to be screwed into the socket 24. The under face of the cap 29 is of convex form and is formed with an upwardly-inclined duct 31, extending through the periphery of the cap. The convexity of the inner or under face of the cap 29 coöperates with the depending annular flange 30 to form a chamber 32, into which pass the gases generated within the battery and from whence they es- cape through the duct 31 to the outer air.

A yielding ring-washer 33 is interposed between the cap 29 and the shoulder 25 of the cover.

The lamp 34, supported within a suitable reflector 35 at the front of the battery, is connected by wire conductors 36 and 37 with the opposite elements of the battery, as illustrated in Fig. 6, the opposing elements 38 and 39 being connected by a wire 40. All of these wires are preferably embedded in the bottom and front wall of the cell, and the terminals of the conductors 36 and 37 are connected to the contact-points of the lamp 34.

A switch 41 controls a break in the conductor 37 and bridges the space between contacts 42 and 43, projecting from the wall of the cell. The wires 36 and 37 are also shown in section in Fig. 3.

Having thus described our invention, what we desire to claim and secure by Letters Patent is—

1. In a primary battery, the combination with the casing, of a metallic rod supported therein and slotted vertically at its upper end.

2. In a primary battery, the combination with the casing, of a metallic rod the lower end of which is embedded in the bottom of the casing, while its upper end is vertically slotted, and a zinc element provided with a hollow seat or cavity to adapt it to fit over the metallic rod.

3. In a primary battery, the combination with the casing, of a metallic rod secured at its lower end to the bottom of the casing and provided with a protecting coating or covering, and slitted or bifurcated at its upper end, and a zinc element provided with a socket adapting the zinc to fit over the rod.

4. In a primary battery, the combination with the casing, of a metallic rod secured at its lower end to the bottom of the casing and provided with a tapered protecting-covering, and slitted at its upper end, and a zinc element provided with a socket adapting the zinc to fit over the rod and the upper reduced portion of its protecting-covering.

5. In a primary battery, the combination with the casing, of a metallic rod constituting one terminal of the battery and enlarged at its lower end and embedded in the bottom of the casing, and vertically slitted at its upper end, a protecting-covering extending from the bottom of the casing part way upwardly of the height of the rod, and a zinc element provided with a socket or recess at its lower end and adapted to fit over the rod and extend downward to overlap the protecting-coating of the rod.

6. In a primary battery, the combination with the casing, of a cover provided with a central recess on its under side, a circular boss projected from its upper face and having a threaded recess, an opening communicating with said recesses, a cap externally screw-threaded, the under face of which is convex in form, a duct extending through the periphery of the cap to the recess in said boss, and a washer secured by the annular projecting portion of said cap, substantially as shown and described.

In testimony whereof we affix our signatures in presence of two witnesses.

THOMAS F. BOLAND.
HARRY C. HUBBELL.

Witnesses:
L. C. SIMS,
JAMES DURIE.